United States Patent
VanBlon et al.

(10) Patent No.: US 9,594,443 B2
(45) Date of Patent: Mar. 14, 2017

(54) WEARABLE DEVICE AUTHENTICATION AND OPERATION

(71) Applicant: LENOVO (Singapore) PTE, LTD., New Tech Park (SG)

(72) Inventors: Russell Speight VanBlon, Raleigh, NC (US); Alan Ladd Painter, Cary, NC (US); Axel Ramirez Flores, Cary, NC (US); Jennifer Greenwood Zawacki, Hillsborough, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 263 days.

(21) Appl. No.: 14/191,215

(22) Filed: Feb. 26, 2014

(65) Prior Publication Data

US 2015/0241998 A1    Aug. 27, 2015

(51) Int. Cl.
| | |
|---|---|
| *G06F 3/03* | (2006.01) |
| *G06F 3/038* | (2013.01) |
| *G06F 3/0354* | (2013.01) |
| *G06K 19/077* | (2006.01) |
| *G06F 21/44* | (2013.01) |
| *G06F 21/83* | (2013.01) |

(52) U.S. Cl.
CPC ........ *G06F 3/0383* (2013.01); *G06F 3/03545* (2013.01); *G06F 21/44* (2013.01); *G06F 21/83* (2013.01); *G06K 19/07762* (2013.01); *G06F 2203/0331* (2013.01); *G06F 2203/0384* (2013.01)

(58) Field of Classification Search
CPC .... G06F 3/0383; G06F 3/03545; G06F 21/00; G06F 2203/0331; G06F 2203/0384; G06K 19/07762
See application file for complete search history.

(56) References Cited

U.S. PATENT DOCUMENTS

| | | | | |
|---|---|---|---|---|
| 5,486,112 | A * | 1/1996 | Troudet | G09B 13/04 2/160 |
| 5,926,144 | A * | 7/1999 | Bolanos | G04B 47/025 343/718 |
| 6,127,990 | A * | 10/2000 | Zwern | G09B 21/008 345/158 |
| 6,747,632 | B2 * | 6/2004 | Howard | G06F 3/014 345/157 |
| 6,781,570 | B1 * | 8/2004 | Arrigo | G06F 3/0317 345/156 |
| 6,870,526 | B2 * | 3/2005 | Zngf | G06F 3/014 345/156 |
| 7,702,282 | B2 * | 4/2010 | Sandegard | G06F 1/1626 455/100 |
| 8,179,604 | B1 * | 5/2012 | Prada Gomez | G02B 27/0093 345/8 |
| 8,243,050 | B2 * | 8/2012 | Adkiins | G06F 3/03545 345/173 |

(Continued)

FOREIGN PATENT DOCUMENTS

WO    2007/001809 A2    1/2007

*Primary Examiner* — Brian Miller
(74) *Attorney, Agent, or Firm* — Kunzler Law Group (57) ABSTRACT

For wearable device authentication and operation, code authenticates the wearable device to an electronic device. In addition, the code performs a wearable device operation in response to an operation command from the electronic device.

20 Claims, 12 Drawing Sheets

(56) References Cited

U.S. PATENT DOCUMENTS

| | | | | |
|---|---|---|---|---|
| 8,292,833 B2* | 10/2012 | Son | | A61B 5/1126 250/316.1 |
| 8,405,612 B2* | 3/2013 | Kruse | | G06F 3/014 345/163 |
| 8,417,185 B2* | 4/2013 | Braho | | G10L 15/30 455/41.2 |
| 8,419,204 B2* | 4/2013 | Hermann, II | | G08B 5/36 345/179 |
| 8,508,472 B1* | 8/2013 | Wieder | | G06F 3/0304 345/156 |
| 8,660,300 B2* | 2/2014 | Svajda | | G06K 9/00355 345/175 |
| 8,767,014 B2* | 7/2014 | Vaught | | G02B 27/017 345/633 |
| 8,903,671 B2* | 12/2014 | Park | | G08B 21/18 702/104 |
| 8,933,876 B2* | 1/2015 | Galor | | G06F 3/005 345/156 |
| 9,035,878 B1* | 5/2015 | Wheeler | | G06F 3/0484 345/156 |
| 9,129,295 B2* | 9/2015 | Border | | G02B 5/23 |
| 9,189,022 B2* | 11/2015 | Burgess | | G06F 1/163 |
| 9,310,887 B2* | 4/2016 | Wieder | | G06F 3/04815 |
| 9,338,340 B2* | 5/2016 | Freund | | H04N 5/23203 |
| 2004/0192260 A1 | 9/2004 | Sugimoto | | |
| 2005/0014534 A1 | 1/2005 | Hareng et al. | | |
| 2006/0187203 A1* | 8/2006 | Piraneque | | G06F 1/1626 345/158 |
| 2009/0124296 A1 | 5/2009 | Tanae | | |
| 2010/0201625 A1* | 8/2010 | Urbach | | G06F 3/0338 345/163 |
| 2011/0007035 A1* | 1/2011 | Shai | | G06F 3/014 345/179 |
| 2012/0056805 A1* | 3/2012 | Bronner, Sr. | | G06F 3/014 345/157 |
| 2012/0249419 A1* | 10/2012 | Bronner, Sr. | | G06F 3/014 345/157 |
| 2013/0106603 A1 | 5/2013 | Weast et al. | | |
| 2013/0328770 A1* | 12/2013 | Parham | | G06F 3/0304 345/157 |
| 2014/0104156 A1* | 4/2014 | Touma | | G06F 3/014 345/156 |
| 2014/0240103 A1* | 8/2014 | Lake | | G08C 17/02 340/12.5 |
| 2014/0279528 A1* | 9/2014 | Slaby | | H04L 63/0853 705/44 |
| 2015/0009096 A1* | 1/2015 | Lee | | G06F 3/1462 345/2.2 |
| 2015/0062086 A1* | 3/2015 | Nattukallingal | | G06F 3/016 345/175 |
| 2015/0126873 A1* | 5/2015 | Connor | | A61B 5/4866 600/475 |
| 2015/0133193 A1* | 5/2015 | Stotler | | G06F 1/163 455/557 |
| 2015/0241976 A1* | 8/2015 | Zhao | | G06F 3/017 345/158 |
| 2015/0277559 A1* | 10/2015 | Vescovi | | G06F 3/014 345/173 |
| 2015/0301644 A1* | 10/2015 | Walley | | G06F 3/011 345/174 |

* cited by examiner

WEARABLE DEVICE AUTHENTICATION AND OPERATION

FIELD

The subject matter disclosed herein relates to a wearable device and more particularly relates to wearable device authentication and operation.

BACKGROUND

Description of the Related Art

Wearable devices provide functional capabilities that are conveniently available to the wearer. However, some wearable devices may have minimal controls or user interfaces.

BRIEF SUMMARY

An apparatus for wearable device authentication and operation is disclosed. The apparatus includes a wearable device with a processor and a memory that stores code executable by the processor. The code authenticates the wearable device to an electronic device. In addition, the code performs a wearable device operation in response to an operation command from the electronic device. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
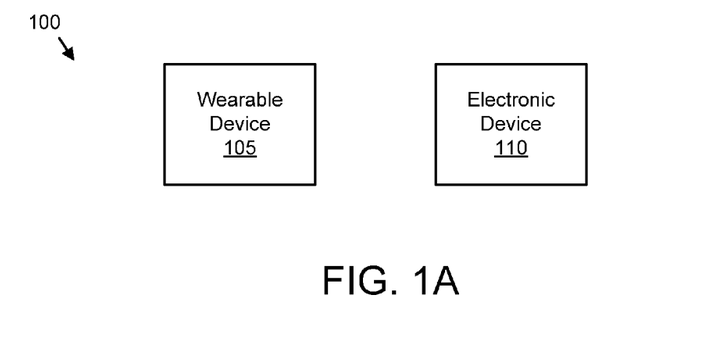
FIG. 1A is a schematic block diagram illustrating one embodiment of a wearable device system.

FIG. 1 is a schematic block diagram illustrating one embodiment of a wearable device system 100. The system 100 includes a wearable device 105 and an electronic device 110. In one embodiment, the wearable device 105 is disposed upon a user. In addition, the wearable device 105 may not be manually held by the user.

In one embodiment, the wearable device 105 has a user interface. The user interface may be selected from the group consisting of a user interface with one or less physical controls, a user interface with an operations to physical control ratio of greater than 10, a user interface with an operations to physical control ratio of greater than 50, a user interface area of less than 9 square centimeters, and a user interface with physical controls disposed within an area of less than 2.5 square centimeters. Alternatively the wearable device 105 may have no user interface.

In one embodiment, the wearable device 105 may have a separate input device. The input device may be a stylus, a pen, a control fob, or the like.

The electronic device 110 may be a mobile telephone, a tablet computer, a laptop computer, a computer workstation, a server, or the like. In one embodiment, the electronic device 110 has a wireless connection with the wearable device 105.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

The wearable device 105 may be disposed on the user, on the user's clothing, or the like. As a result, the wearable device 105 may be conveniently accessible by the user. However, by disposing the wearable device 105 on the user, the user interface of the wearable device 105 may be small and/or lack physical controls for all of the operations of the wearable device 105. As a result, the usefulness of wearable devices 105 has been limited.

The embodiments described herein authenticate the wearable device 105 to the electronic device 110. In addition, the embodiments perform a wearable device operation in response to an operation command from the electronic device 110. As a result, the operations that may be performed for, with, and by the wearable device 105 are greatly expanded as will be described hereafter.

Figure 1B:
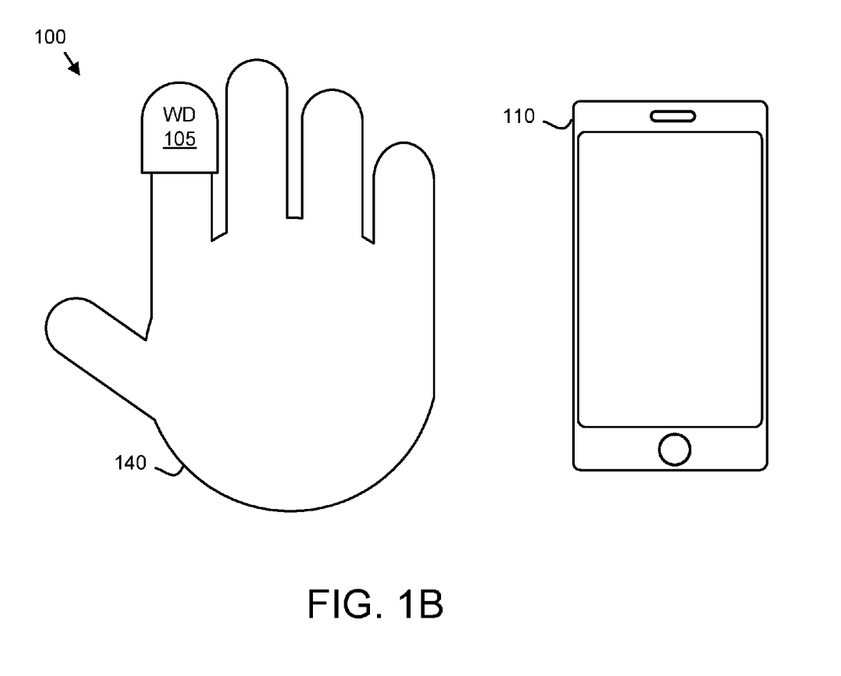
FIG. 1B is a front view drawings illustrating one embodiment of a wearable device system.

FIG. 1B is a front view drawings illustrating one embodiment of a wearable device system 100. In the depicted embodiment, the wearable device 105 is a finger mounted wearable device 105 disposed on a finger of a hand 140. In addition, the electronic device 110 is depicted is a mobile telephone. The embodiments will be described for the finger mounted wearable device 105 and a mobile telephone electronic device 110. However, the embodiments may be practiced with other wearable devices 105 and other electronic devices 110.

Figure 2A:
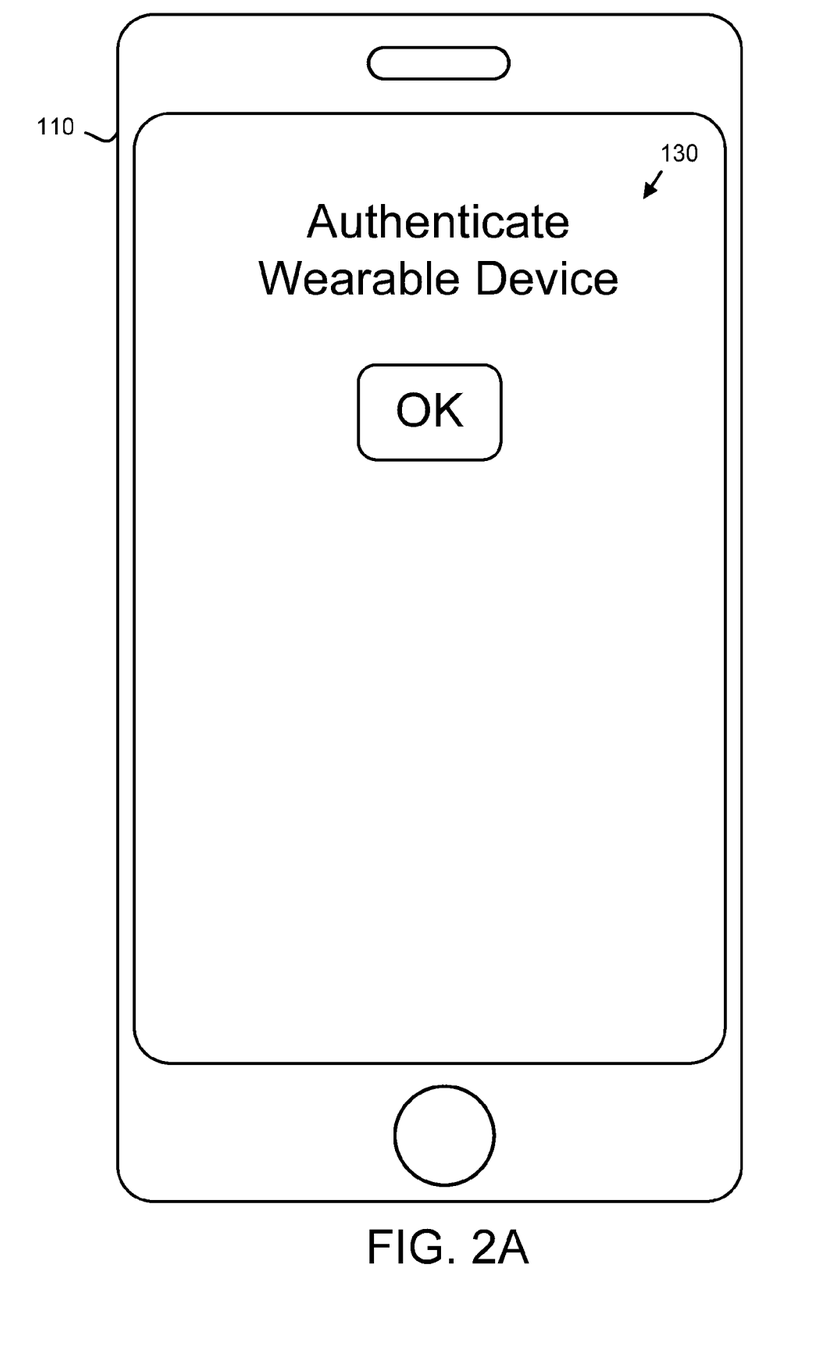
FIG. 2A is a front view drawing illustrating one embodiment of an electronic device.

FIG. 2A is a front view drawing illustrating one embodiment of an electronic device 110. In the depicted embodiment, the wearable device 105 communicates authentication data to the electronic device 110. The electronic device 110 may display an authentication dialog 130 in response to receiving the authentication data. A user may activate the authentication dialog 130 to authenticate the wearable device 105.

Alternatively, the electronic device 110 may automatically authenticate the wearable device 105. In one embodiment, the electronic device 110 automatically authenticates the wearable device 105 in response to recognizing the wearable device 105.

Figure 2B:
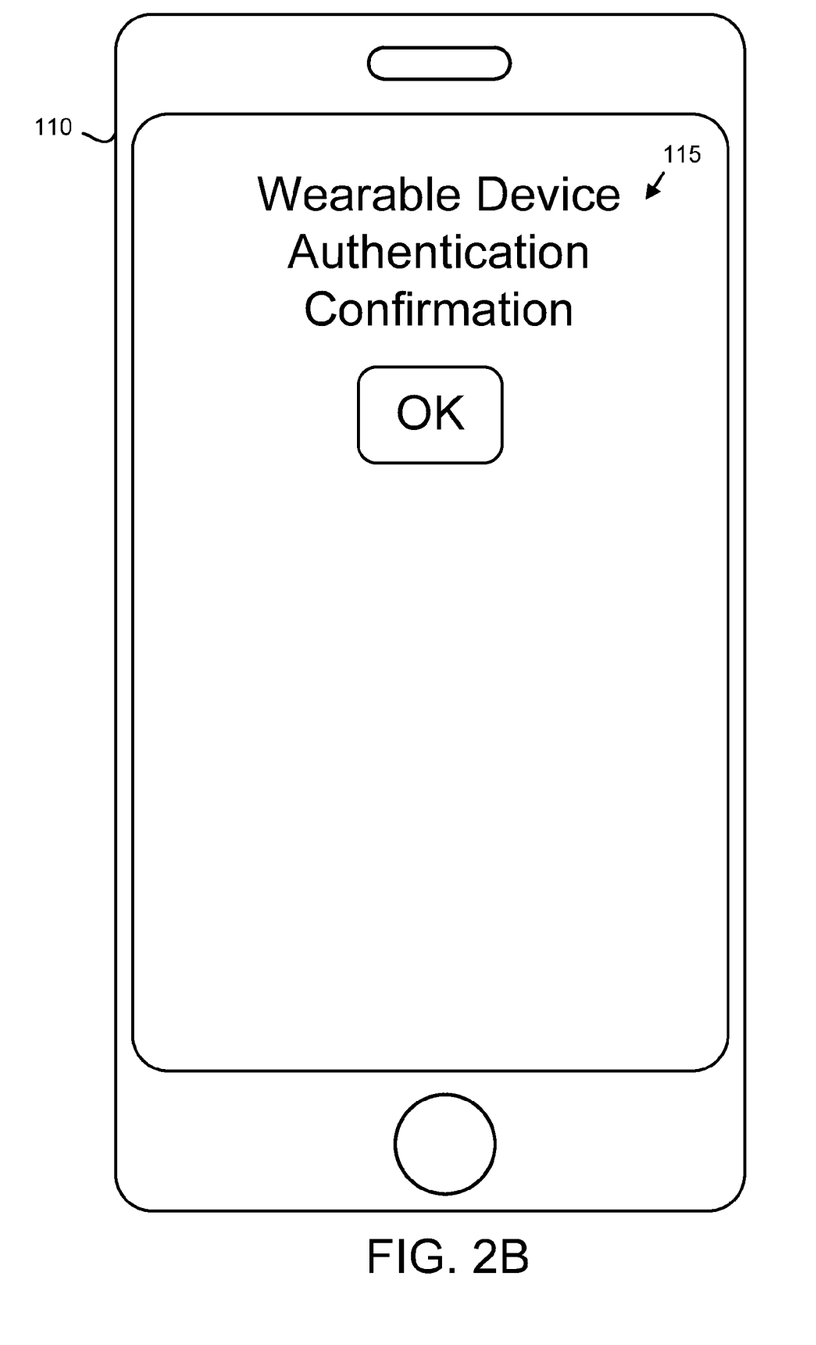
FIG. 2B is a front view drawing illustrating one alternate embodiment of an electronic device.

FIG. 2B is a front view drawing illustrating one alternate embodiment of the electronic device 110. In the depicted embodiment, the electronic device 110 displays a wearable device authentication confirmation dialogue 115 in response to authenticating the wearable device 105. The user may activate the authentication confirmation dialog 115 to communicate an authentication confirmation to the wearable device 105. Alternatively, the electronic device 110 may automatically communicate the authentication confirmation to the wearable device 105 in response to authenticating the wearable device 105.

Figure 2C:
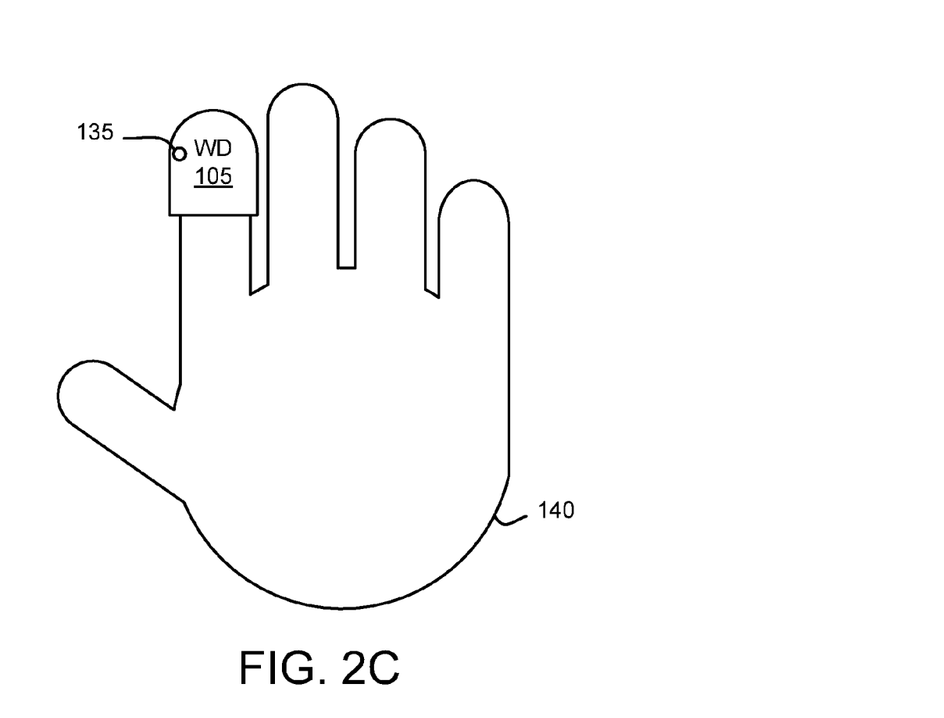
FIG. 2C is a front view drawing illustrating one embodiment of a wearable device disposed on a hand.

FIG. 2C is a front view drawing illustrating one embodiment of a wearable device 105 disposed on a finger of the hand 140. In the depicted embodiment, the wearable device 105 includes an indicator light 135. In one embodiment, the wearable device 105 receives the authentication confirmation and signals the authentication confirmation from the electronic device 110 by activating the indicator light 135. Alternatively, the wearable device 105 may employ an audible tone, vibration, and the like to signal the authentication confirmation.

Figure 2D:
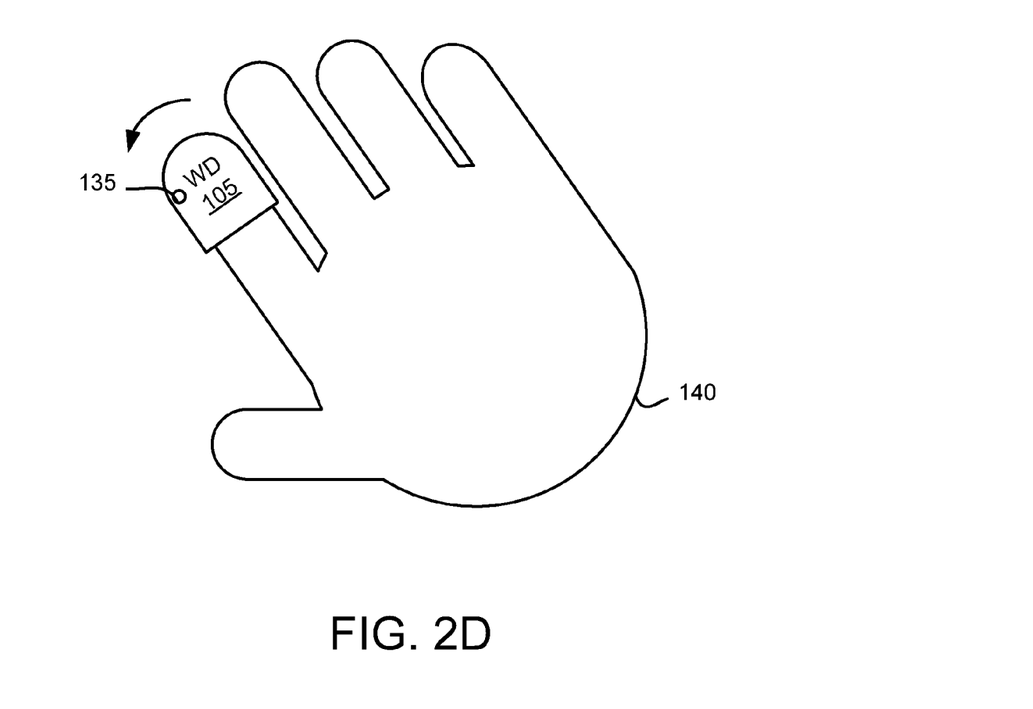
FIG. 2D is a front view drawing illustrating one alternate embodiment of a wearable device disposed on a hand.

FIG. 2D is a front view drawing illustrating one embodiment of a wearable device 105 disposed on the 140 hand. In one embodiment, the user may acknowledge the authentication confirmation within authentication confirmation acknowledgment. In the depicted embodiment, the user rotates the hand 140, rotating the wearable device 105 to signal the authentication confirmation acknowledgment. The rotation may be detected by an accelerometer in the wearable device 105. The wearable device 105 may complete the authentication in response to the authentication confirmation acknowledgment.

In an alternative embodiment, the user may employ an audible command, a touch of a physical control, or the like to signal the authentication confirmation acknowledgment. In a certain embodiment, the wearable device automatically completes the authentication without the user signaling the authentication confirmation acknowledgment.

Figure 2E:
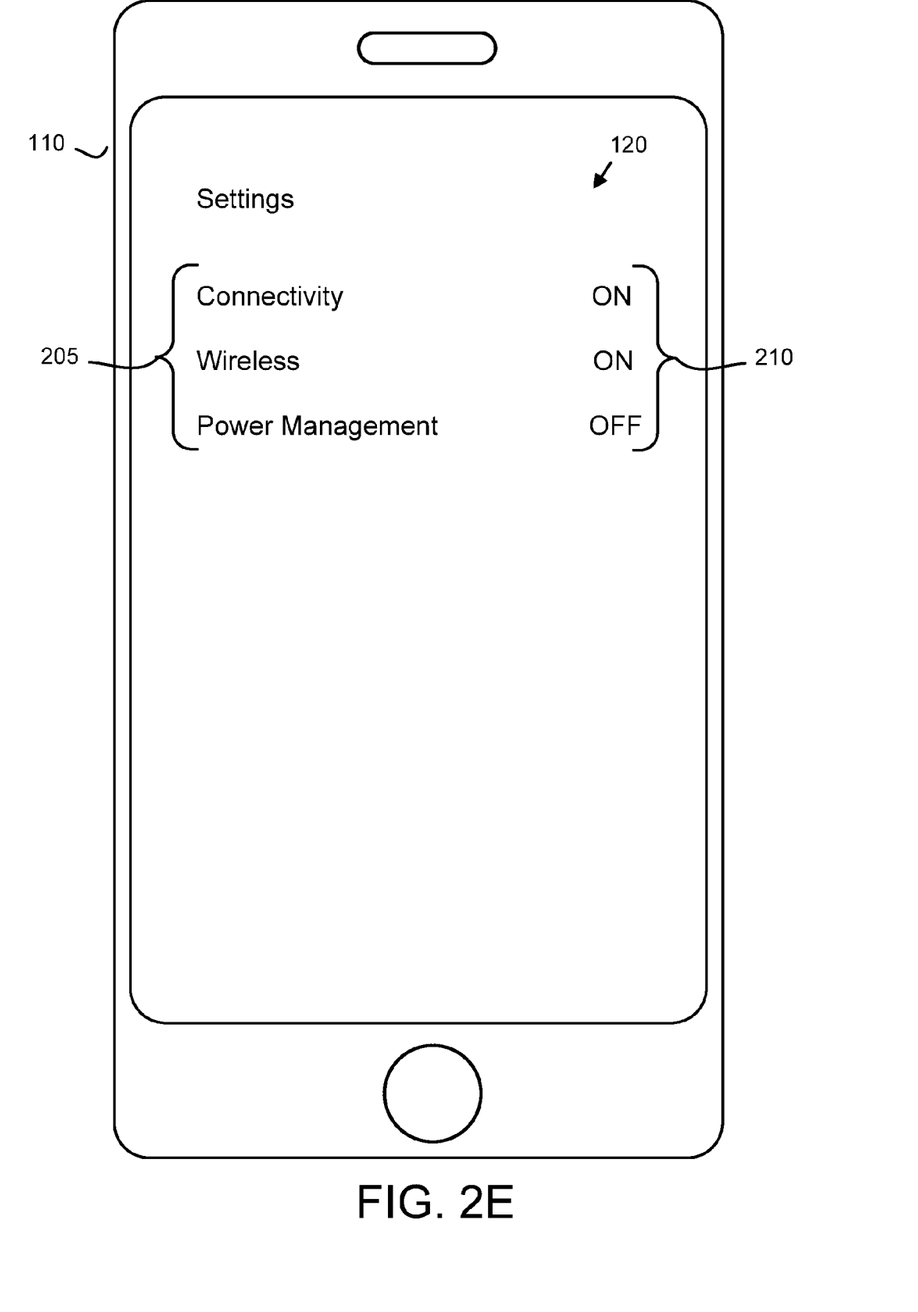
FIG. 2E is a front view drawing illustrating one alternate embodiment of an electronic device.

FIG. 2E is a front view drawing illustrating one embodiment of the electronic device 110 with configuration settings 120. In one embodiment, a wearable device operation includes configuration settings 120 for the wearable device 105. The electronic device 110 may display the configuration settings 120 in response to authenticating the wearable device 105.

Alternatively, the electronic device 110 may display the configuration settings 120 in response to the wearable device 105 completing the authentication. In a certain embodiment, the wearable device 105 may communicate an authentication completion to the electronic device 110 in response to the authentication confirmation acknowledgment.

The configuration settings 120 may include configuration data 205 and configuration parameters 210. The wearable device 105 may communicate the configuration data 205 to the electronic device 110. In addition, the wearable device 105 may communicate the configuration parameters 210 to the electronic device 110. In a certain embodiment, the wearable device 105 communicates initial configuration parameters 210 to the electronic device 110. Alternatively, the wearable device 105 communicates current configuration parameters 210 to the electronic device 110.

A user may set and/or modify the configuration parameters 210 on the electronic device 110. Alternatively, the electronic device 110 may automatically modify the configuration parameters 210 based on stored configuration preferences. The electronic device 110 may communicate the configuration parameters 210 to the wearable device 105. The wearable device 105 may be configured in response to the configuration parameters 210 received from the electronic device 110.

Figure 2F:
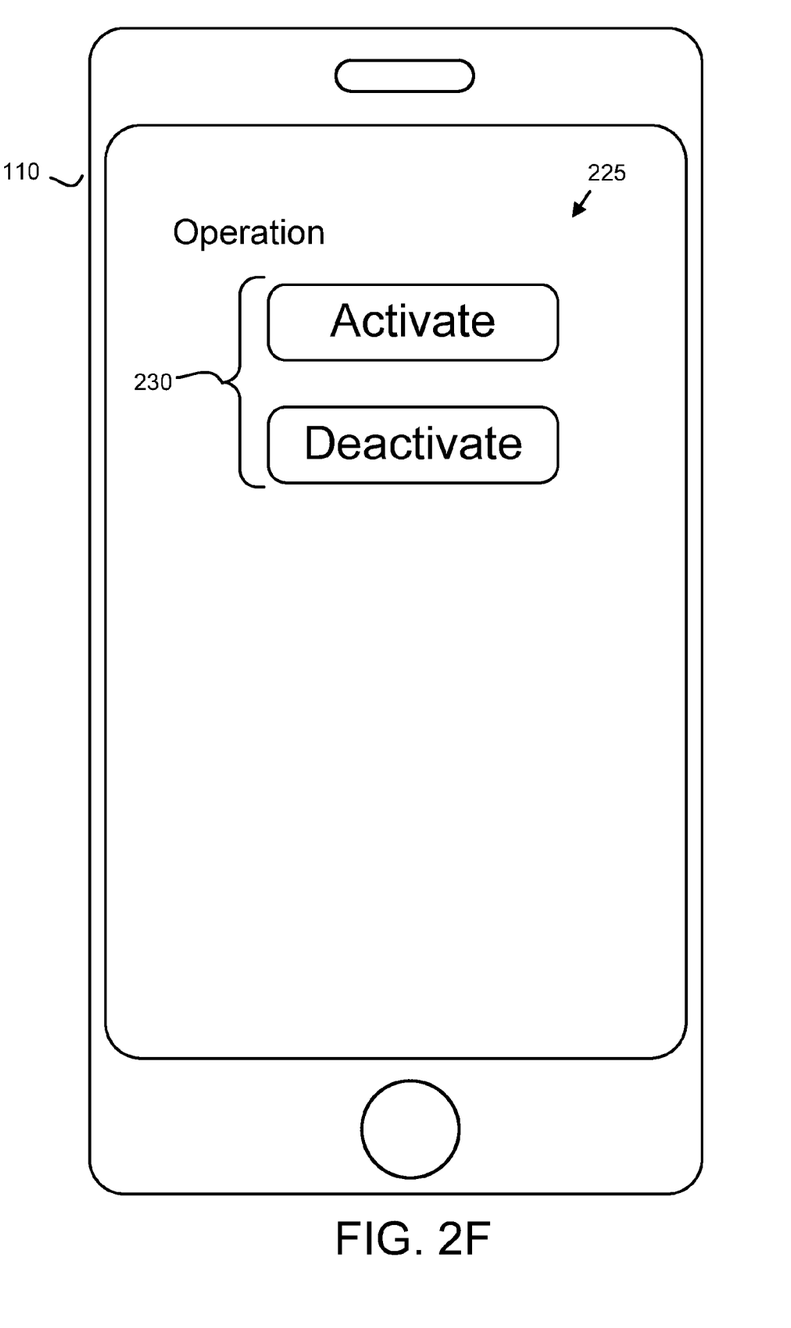
FIG. 2F is a front view drawing illustrating one alternate embodiment of an electronic device.

FIG. 2F is a front view drawing illustrating one embodiment of the electronic device 110 displaying operation data 225. In one embodiment, the wearable device 105 communicates the operation data 225 to the electronic device 110. In addition, the wearable device 105 may communicate operation commands 230 to the electronic device 110. The electronic device 110 may display the operation data 225 and the operation commands 230 and receive a selection of the operation commands 230. The electronic device 110 may further communicate the selected operation command 230 to the wearable device 105. The wearable device 105 may perform a function in response to the selected operation command 230.

Figure 3:
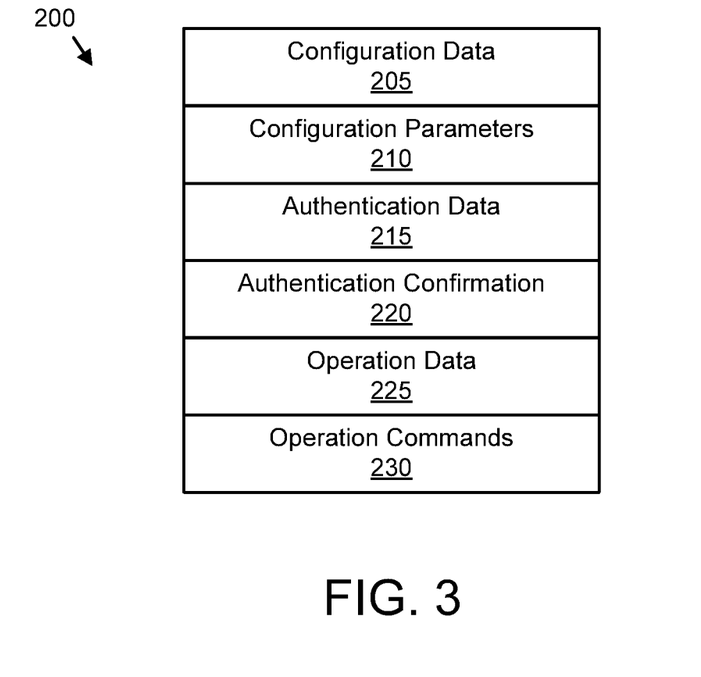
FIG. 3 is a schematic block diagram illustrating one embodiment of a wearable device data.

FIG. 3 is a schematic block diagram illustrating one embodiment of a wearable device data 200. The wearable device data 200 may be stored in a data structure of a memory on the wearable device 105. Portions of the wearable device data 200 may be communicated to the electronic device 110. In the depicted embodiment, the wearable device data 200 includes the configuration data 205, the configuration parameters 210, authentication data 215, the authentication confirmation 220, the operation data 225, and the operation commands 230.

The configuration data 205 may include settings, identifiers, user information, and the like for configuring the wearable device 105. The configuration parameters 210 may comprise the parameters for the settings, data files, and user information.

The authentication data 215 may include a user identifier, a wearable device identifier, a password, and the like for authenticating the wearable device 105 to the electronic device. The authentication confirmation 220 may be received from the electronic device 110. In one embodiment, the authentication confirmation 220 comprises a secure credential that is used to securely communicate with the electronic device 110.

The operation data 225 may include operations, functions, and actions that may be performed by the wearable device 105. The operation commands 230 may activate the operations, functions, and actions.

Figure 4:
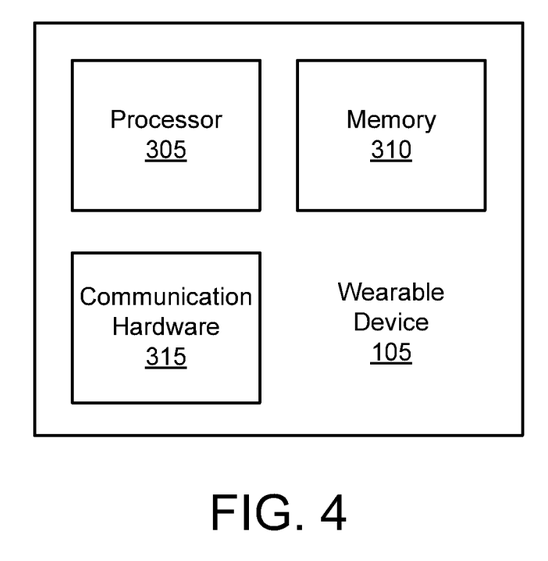
FIG. 4 is a schematic block diagram illustrating one embodiment of a wearable device.

FIG. 4 is a schematic block diagram illustrating one embodiment of a wearable device 105. The wearable device 105 may include a processor 305, a memory 310, and communication hardware 315. The memory 310 may be a semiconductor storage device. Alternatively, the memory 310 may be a micromechanical storage device. The memory 310 may store code. The processor 305 may execute the code. The communication hardware 315 may include a wireless transceiver that may provide the wireless connection to the electronic device 110.

Figure 5:
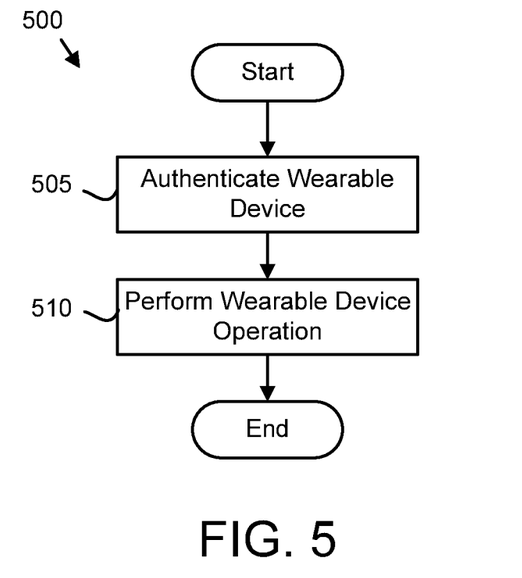
FIG. 5 is a schematic flow chart diagram illustrating one embodiment of a wearable device authentication and operation method.

FIG. 5 is a schematic flow chart diagram illustrating one embodiment of a wearable device authentication and operation method 500. The method 500 may perform the functions of the wearable device system 100. The method 500 may be performed by use of the processor 305. Alternatively, the method may be embodied in a program product. The program product may comprise a computer readable storage medium such as the memory 310. The computer readable storage media may store code executable by the processor 305 to perform the method 500.

The method 500 starts, and in one embodiment, the code authenticates 505 the wearable device 105 to the electronic device 110. The wearable device 105 may be authenticated 505 to the electronic device 110 by concurrent accelerations of the wearable device 105 and the electronic device 110. For example, the wearable device 105 may be knocked against the electronic device 110. Accelerometers in the wearable device 105 and the electronic device 110 may detect the knock to authenticate 505 the wearable device 105 to the electronic device 110. In addition, the wireless device 105 may communicate over the wireless connection with the electronic device 110 to complete the authentication.

In one embodiment, the wearable device 105 is authenticated 505 to the electronic device 110 in response to a near field communication (NFC) exchange between the wearable device 105 and electronic device 110. Alternatively, the wearable device 105 may be authenticated 505 to the electronic device 110 in response to a radio frequency identification (RFID) exchange between the wearable device 105 and electronic device 110. In a certain embodiment, the wearable device 105 is authenticated 505 in response to a BLUETOOTH® pairing between the wearable device 105 and electronic device 110.

In one embodiment, the wearable device 105 communicates the authentication data 215 to electronic device 110. The electronic device 110 may complete the authentication 505 in response to the authentication data 215. Embodiments of the authentication 505 are described in more detail in FIG. 6.

The code may further perform 510 a wearable device operation in response to commands from the electronic device 110 and the method 500 ends. In one embodiment, the wearable device operation comprises configuring settings for the wearable device 105. Configuring settings for the wearable device 105 is described in more detail in FIG. 7.

An alternative embodiment, the wearable device operation is an active function of the wearable device 105. Performing active functions of the wearable device 105 are described in more detail in FIG. 8. In one embodiment, the wearable device operation is selected in response to one or more of a time, a time of day, a location, and a weather forecast.

Figure 6:
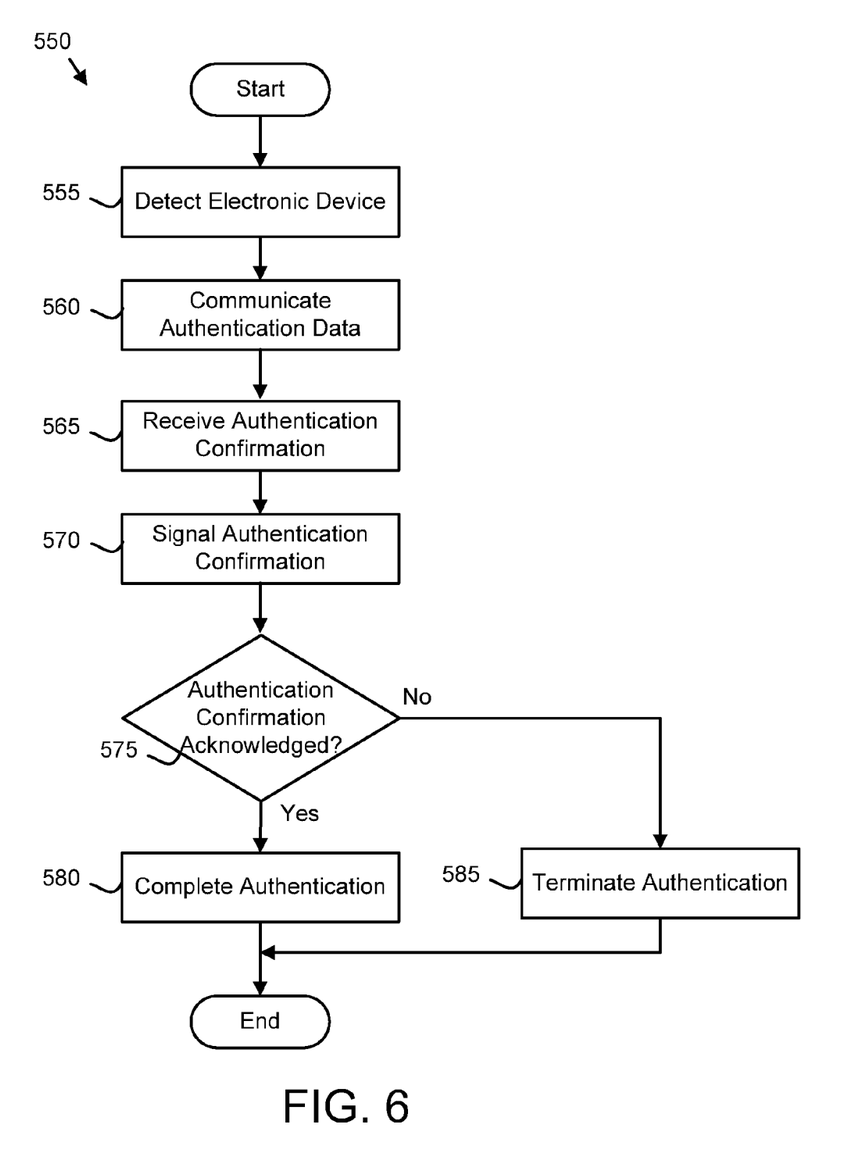
FIG. 6 is a schematic flow chart diagram illustrating one embodiment of an authentication method.

FIG. 6 is a schematic flow chart diagram illustrating one embodiment of an authentication method 550. The authentication method 550 may perform the functions of the authenticate wearable device step 505 of FIG. 5. The method 550 may perform the functions of the wearable device system 100. The method 550 may be performed by use of the processor 305. Alternatively, the method may be embodied in a program product. The program product may comprise a computer readable storage medium such as the memory 310. The computer readable storage media may store code executable by the processor 305 to perform the method 550.

The method 550 starts, and in one embodiment, the code detects 555 the electronic device 110. The code may detect 555 electronic device 110 through the wireless connection.

Alternatively, the code detects 555 the electronic device 110 through one or more of concurrent accelerations of the wearable device 105 and electronic device 110, and NFC exchange, an RFID exchange, and a BLUETOOTH® pairing.

The code may communicate 560 the authentication data 215 to the electronic device 110. In addition, the code may receive 565 the authentication confirmation 220 from the electronic device 110 in response the electronic device 110 authenticating the wearable device 105.

In one embodiment, the code signals 570 the authentication confirmation. For example, may flash the indicator light 135 to signal 570 the authentication confirmation.

In one embodiment, the code determines 575 if the authentication confirmation acknowledgement is received. If the authentication confirmation acknowledgment is not received, the code may terminate 585 the authentication and the method 550 ends.

If the authentication confirmation acknowledgment is received, the code may complete 580 the authentication and the method 550 ends. In one embodiment, the code may employ the secure credential of the authentication confirmation 220 to communicate with the electronic device 110. In a certain embodiment, the code may complete 580 the authentication without determining if the authentication confirmation acknowledgment is received.

Figure 7:
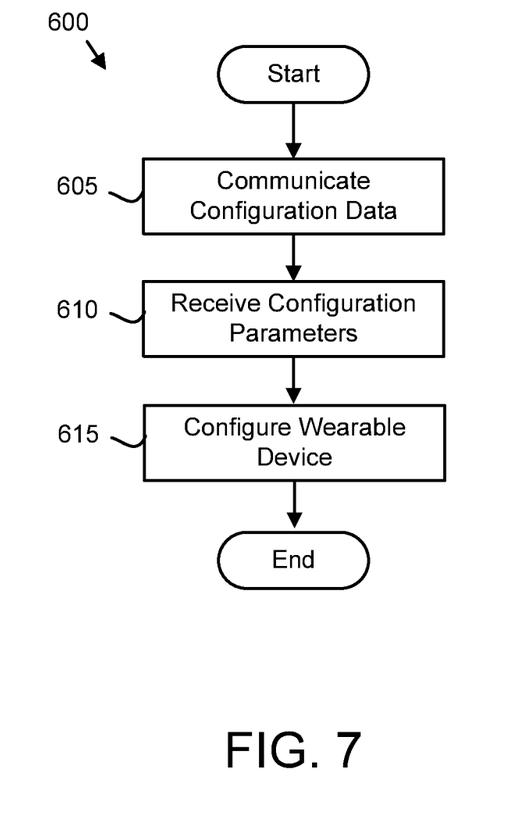
FIG. 7 is a schematic flow chart diagram illustrating one embodiment of a configuration method.

FIG. 7 is a schematic flow chart diagram illustrating one embodiment of a configuration method 600. The method 600 may be the perform wearable device operation step 510 of FIG. 5. The method 600 may perform the functions of the wearable device system 100. The method 600 may be performed by use of the processor 305. Alternatively, the method may be embodied in a program product. The program product may comprise a computer readable storage medium such as the memory 310. The computer readable storage media may store code executable by the processor 305 to perform the method 600.

The method 600 starts, and in one embodiment, the code communicates 605 the configuration data 205 to electronic device 110. In addition, the code may communicate the configuration parameters 210 with the configuration data 205 to the electronic device 110. In one embodiment, the configuration data 205 describes all wearable device functions. In addition, the configuration data 205 may describe all wearable device settings.

In an alternative embodiment, the configuration data 205 describes wearable device operations that are compatible with the electronic device 110. For example, if the electronic device 110 lacks the functionality to perform a first wearable device operation, the code may not communicate the configuration data 205 for the first wearable device operation.

The electronic device 110 may display the configuration data 205 and receive selections of the configuration parameters 210. The electronic device 110 may further communicate the selected configuration parameters 210 to the wearable device 105.

The code may receive 610 the configuration parameters 210 from the electronic device 110. In addition, the code may configure 615 the wearable device 105 in response to the configuration parameters 210 and the method 600 ends. For example, the code may change the audio settings of the wearable device 110 using the configuration parameters 210.

Figure 8:
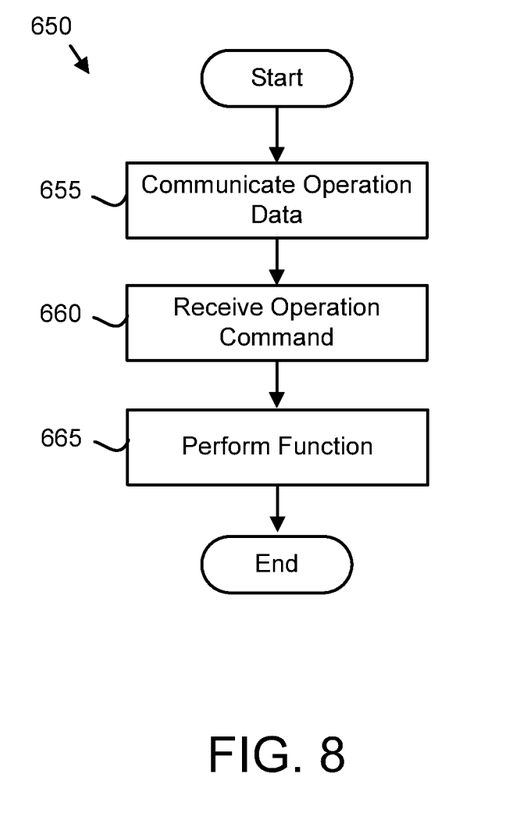
FIG. 8 is a schematic flow chart diagram illustrating one embodiment of an operation method.

FIG. 8 is a schematic flow chart diagram illustrating one embodiment of an operation method 650. The method 650 may be the perform wearable device operation step 510 of FIG. 5. The method 650 may perform the functions of the wearable device system 100. The method 650 may be performed by use of the processor 305. Alternatively, the method may be embodied in a program product. The program product may comprise a computer readable storage medium such as the memory 310. The computer readable storage media may store code executable by the processor 305 to perform the method 650.

The method 650 starts, and in one embodiment, the code communicates 655 the operation data 225 to the electronic device 110. In addition, the code may communicate the operation commands 230 to the electronic device 110. The electronic device 110 may display the operation data 225 and receive a selection of an operation command 230. In addition, the electronic device 110 may communicate the selected operation command 230 to the wearable device 105.

The code may receive the selected operation command 230 from the electronic device 110. In addition the code may perform 665 a function in response the operation command 230 and the method 650 ends. For example, a user may select a record command on the electronic device 110 and the wearable device 105 may perform a record function in response to the record operation command.

By authenticating the wearable device 105 to the electronic device 110, the embodiments support the electronic device 110 being used as an interface for performing wearable device operations in response to commands from the electronic device 110. The wearable device operations may include configuring the wearable device and/or performing wearable device functions. As a result, the user interface of the electronic device 110 is employed to extend the user interface of the wearable device 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wearable device comprising:
 a user interface with no physical controls;
 a processor;
 a memory that stores code executable by the processor to:
 detect an electronic device;
 communicate authentication data to the electronic device;
 receive an authentication confirmation from the electronic device at the wearable device that the authentication data is received by the electronic device;
 signal the authentication confirmation at the wearable device using one of an indicator light, an audible tone, and a vibration;
 receive an authentication confirmation acknowledgement that the authentication confirmation is received, the authentication confirmation acknowledgement comprising a rotation of the wearable device;
 communicate configuration data to the electronic device in response to receiving the authentication confirmation acknowledgement, wherein the configuration data comprises operation data and a corresponding operation commands that are displayed by the electronic device;
 and
 perform a wearable device operation in response to the operation command from the electronic device.

2. The wearable device of claim 1, wherein the wearable device operation comprises configuring settings for the wearable device and the processor further:

receives configuration parameters from the electronic device; and configures the wearable device in response to the configuration parameters.

3. The wearable device of claim 1, wherein the processor further:

receives the operation command from the electronic device; and performs a function in response to the operation command.

4. The wearable device of claim 1, wherein the wearable device comprises an accelerometer and the authentication confirmation acknowledgement is detected by the accelerometer.

5. A method comprising the steps of:

detecting, by use of a processor, an electronic device at a wearable device comprising a user interface with no physical controls;

communicating authentication data to the electronic device;

receiving an authentication confirmation from the electronic device at the wearable device that the authentication data is received by the electronic device;

signaling the authentication confirmation at the wearable device and using one of an indicator light, an audible tone, and a vibration;

receiving an authentication confirmation acknowledgement that the authentication confirmation is received, the authentication confirmation acknowledgement comprising a rotation ofat the wearable device;

communicating configuration data to the electronic device in response to receiving the authentication confirmation acknowledgement, wherein the configuration data comprises operation data and a corresponding operation commands that are displayed by the electronic device;

and performing a wearable device operation in response to the operation command from the electronic device.

6. The method of claim 5, wherein authenticating the wearable device comprises:

completing the authentication in response to an authentication confirmation acknowledgement.

7. The method of claim 5, wherein the wearable device operation comprises configuring settings for the wearable device.

8. The method of claim 7, wherein configuring settings for the wearable device comprises:

receiving configuration parameters from the electronic device; and configuring the wearable device in response to the configuration parameters.

9. The method of claim 8, wherein the configuration data describes all wearable device operations.

10. The method of claim 8, wherein the configuration data describes wearable device operations that are compatible with the electronic device.

11. The method of claim 5, wherein performing the wearable device operation comprises:

communicating operation data to the electronic device;

receiving the operation command from the electronic device; and performing a function in response to the operation command.

12. The method of claim 5, wherein the wearable device operation is selected in response to one or more of a time, a time of day, a location, and a weather forecast.

13. The method of claim 5, wherein the wearable device is further authenticated to the electronic device in response to one or more of concurrent accelerations of the wearable device and the electronic device, a near field communication (NFC) exchange between the wearable device and the electronic device, a radio frequency identification exchange between the wearable device and the electronic device, and a Bluetooth pairing between the wearable device and the electronic device.

14. The method of claim 5, wherein the wearable device is disposed upon a user and is not manually held by the user.

15. The method of claim 5, wherein the wearable device has a separate input device.

16. The method of claim 5, wherein the wearable device comprises an accelerometer and the authentication confirmation acknowledgement is detected by the accelerometer.

17. A program product comprising a computer readable storage medium that stores code executable by a processor to perform:

detecting an electronic device at a wearable device comprising a user interface with no physical controls;

communicating authentication data to the electronic device;

receiving an authentication confirmation from the electronic device at the wearable device that the authentication data is received by the electronic device;

signaling the authentication confirmation at the wearable device and using one of an indicator light, an audible tone, and a vibration;

receiving an authentication confirmation acknowledgement that the authentication confirmation is received, the authentication confirmation acknowledgement comprising a rotation of the wearable device;

communicating configuration data to the electronic device in response receiving to the authentication confirmation acknowledgement, wherein the configuration data comprises operation data and a corresponding operation command that are displayed by the electronic device;

and performing a wearable device operation in response to the operation command from the electronic device.

18. The program product of claim 17, wherein authenticating the wearable device comprises:

completing the authentication in response to an authentication confirmation acknowledgement.

19. The program product of claim 17, wherein the wearable device operation comprises configuring settings for the wearable device by:

receiving configuration parameters from the electronic device; and configuring the wearable device in response to the configuration parameters.

20. The program product of claim 17, wherein performing the wearable device operation comprises:

communicating operation data to the electronic device;

receiving the operation command from the electronic device; and performing a function in response to the operation command.

* * * * *